UNITED STATES PATENT OFFICE.

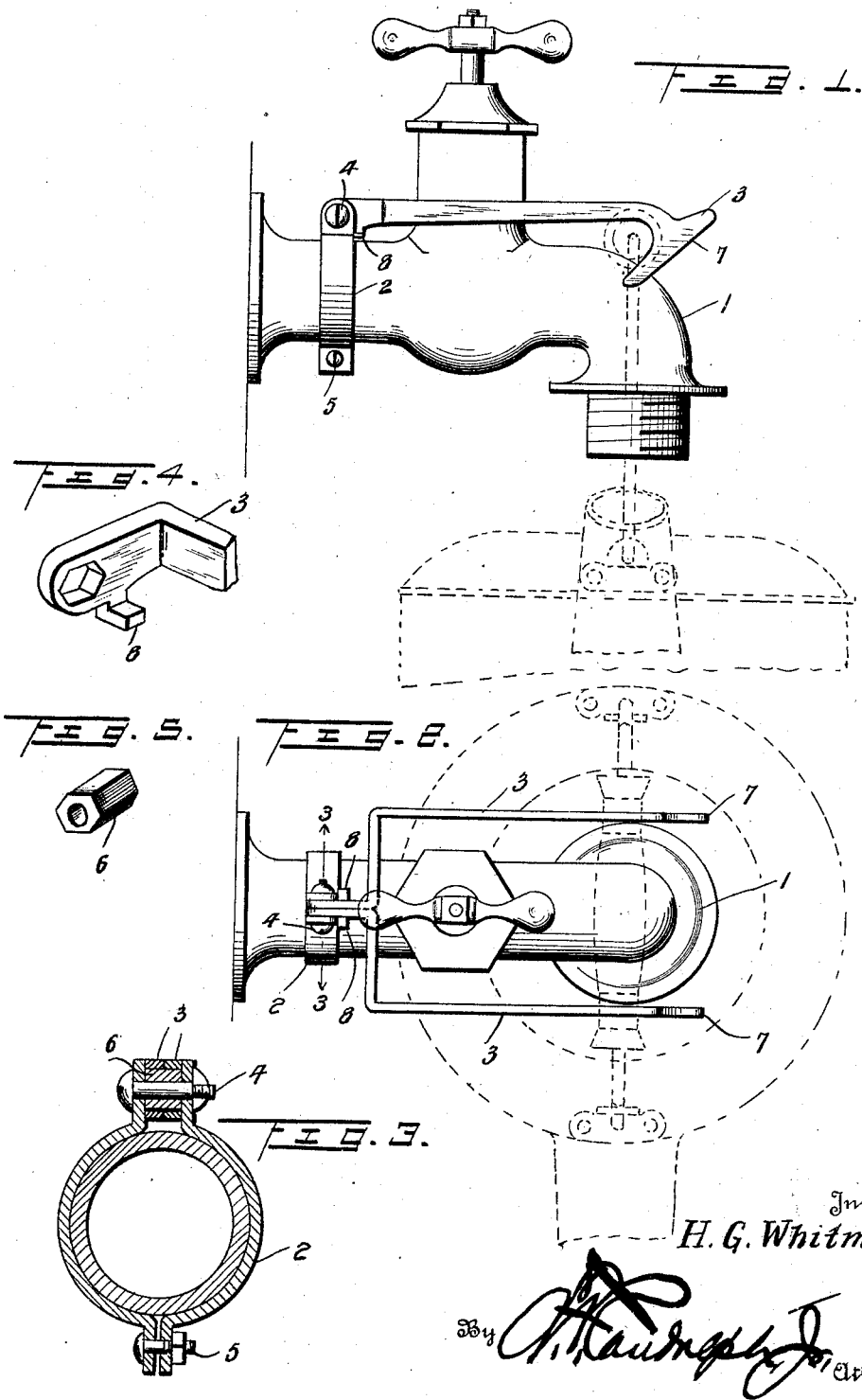

HENRY G. WHITMORE, OF NEWBURYPORT, MASSACHUSETTS.

FAUCET-HOLDER ATTACHMENT.

1,394,383.     Specification of Letters Patent.     Patented Oct. 18, 1921.

Application filed May 5, 1921. Serial No. 467,031.

*To all whom it may concern:*

Be it known that I, HENRY G. WHITMORE, a citizen of the United States, residing at Newburyport, in the county of Essex and State of Massachusetts, have invented certain new and useful Improvements in Faucet-Holder Attachments; and I do hereby declare the following to be a full, clear, and exact description of the invention, such as will enable others skilled in the art to which it appertains to make and use the same.

The invention relates to holders and more particularly to means applicable to the faucets of water fixtures for retaining vessels and receptacles of various kinds in position during filling.

To prevent splashing of the water when filling a vessel, the latter is held close to the faucet. This is both tiresome and requires some effort.

The present invention provides an attachment which may be readily applied to a faucet and which engages the bail or handle of a vessel and retains the latter suspended from the faucet, thereby preventing splashing of the water and obviating the necessity of manually supporting the vessel.

Other objects and advantages will be apparent and suggest themselves as the nature of the invention is understood.

While the drawings illustrate an embodiment of the invention, it is to be understood that in adapting the same to meet different conditions and requirements, various changes in the form, proportion and minor details of construction may be resorted to without departing from the nature of the invention.

Referring to the accompanying drawings forming a part of the specification,

Figure 1 is a side view of a faucet with holding attachment in position, the dotted lines indicating the manner of retaining a vessel on the faucet, Fig. 2 is a top plan view, Fig. 3 is a sectional view taken on the plane indicated by the line 3—3 of Fig. 2, Fig. 4 is a detail perspective view of the pivoted end of one of the hooks, and Fig. 5 is a similar view of the sleeve.

Corresponding and like parts are referred to in the following description and designated in the several views of the drawings by like reference characters.

The numeral 1 designates a faucet of ordinary construction such as applied to the outlet of water fixtures.

The attachment comprises a clamp 2 and a hook 3, the latter being pivotally connected to the clamp 2 and of such relative length as to coöperate with the nozzle of the faucet to engage the bail or handle of the vessel or receptacle and retain the latter in position on the faucet.

The clamp 2 may be of any approved construction and is adapted to engage the shank of the faucet. As shown, the clamp comprises similar or complemental parts disposed upon opposite sides of the shank of the faucet and having offstanding ears to receive bolts 4 and 5. A sleeve 6 is mounted upon the bolt 4 and is of polygonal form in cross section to engage with and insure synchronous movement of the members comprising the hook 3.

The hook 3 comprises complemental members which extend along opposite sides of the bonnet of the faucet 1 to engage the bail or handle of the vessel or receptacle and properly retain the same in position on the faucet. The rear ends of the shanks of the hook members are offset inwardly to engage the upper end of the clamp 2 and are apertured to receive the ends of the sleeve 6 which forms a tie or coupling to cause both members of the hook to move in unison. The bill 7 of the hook extends upwardly and downwardly and its outer face is inclined rearwardly and downwardly to ride upon the bail or handle of the vessel when placing the same in position whereby the hook is automatic in action when placing the vessel in position for suspension from the faucet. The hook engages the handle of the vessel upon opposite sides of nozzle of the faucet, thereby preventing any tilting laterally of the vessel which would be liable to occur if the hook did not engage the handle at a middle point. The hook is provided with a stop 8 for retaining the same in horizontal or normal position. The stop 8 preferably forms a part of each hook member and is disposed to engage the clamp 2.

What is claimed is:

1. A vessel holding attachment for faucets comprising a clamp adapted to engage the shank of the faucet, and a hook pivotally connected to the clamp and adapted to engage the handle of the vessel and retain the same in position on the faucet.

2. A vessel holding attachment for faucets comprising a clamp, and a hook pivotally connected to the clamp and comprising spaced members to extend along opposite sides of the faucet.

3. A vessel holding attachment for faucets comprising a clamp, a hook comprising spaced members, and coupling means connecting the members for synchronous movement and engaging the clamp to pivotally connect said hook members thereto.

4. A holder attachment of the character specified comprising a clamp, a hook comprising spaced members having their rear ends inwardly offset, a sleeve loosely engaging the clamp and forming coupling means between the members of the hook to insure synchronous movement thereof, and a bolt passing through the sleeve and securing the hook members.

5. A vessel holding attachment for faucets, comprising a clamp for engagement with the shank of the faucet and having an offstanding portion, and a hook pivoted to the offstanding portion of the clamp and having a stop adjacent its pivotal end to engage the offstanding portion of the clamp and hold the hook in determinate position.

In testimony whereof I affix my signature in presence of two witnesses.

HENRY G. WHITMORE.

Witnesses:
BERNADETTE WHITMORE,
ELIZABETH HURD.